United States Patent Office 3,746,718
Patented July 17, 1973

3,746,718
PURIFICATION OF TETRAMISOLE
Volker Elmar Maier, Hampton, Victoria, Australia, assignor to Imperial Chemical Industries of Australia and New Zealand Limited, Melbourne, Victoria, Australia
No Drawing. Filed June 3, 1971, Ser. No. 149,840
Claims priority, application Australia, July 2, 1970, 1,704/70
Int. Cl. C07d *99/10*
U.S. Cl. 260—306.7                          8 Claims

ABSTRACT OF THE DISCLOSURE

A process of purifying tetramisole containing as an impurity trans-2-imino-3-styryl thiazolidine which process comprises adding to an aqueous solution of a tetramisole salt a sufficiency of a water soluble salt of phthalic acid, precipitating at least part of the said impurity, removing the precipitated impurity from the aqueous phase by phase separation and recovering the purified tetramisole.

---

The present invention relates to the purification of tetramisole. In particular it relates to the production of a highly purified L-isomer of tetramisole in improved yield and purity.

Tetramisole, D,L - 2,3,5,6-tetrahydro-6-phenylimidazo-(2,1-b)thiazole, which is the subject of British Pat. 1,043,489, is an extremely potent anthelmintic. It is known that its anthelmintic activity is almost entirely attributable to the optical L-isomer and U.S. Pat. 3,579,530, provides a process for the efficient resolution of the racemate to the tetramisole L-isomer.

Technical tetramisole may contain small amounts of the impurity trans-2-imino-3-styryl thiazolidine which is prone to coprecipitate during the resolution process with the optical L-isomer. The removal of this impurity from a pharmaceutical compound is desirable since it contributes to toxicity and therefore requires detailed evaluation, such as metabolite studies. In addition we have found that this impurity substantially reduces the efficiency of the resolution process of U.S. Pat. 3,579,530. An object of the present invention is therefore to reduce the amount of impurities present in technical tetramisole; another object is to remove biologically ineffective or detrimental compounds and yet another object is to improve the efficiency of the above-stated resolution process.

We have now discovered that water soluble salts of phthalic acid, for example disodium phthalate, when added to an aqueous solution of a water soluble salt of crude tetramisole containing the impurity trans-2-imino-3-styryl thiazolidine preferentially precipitate the trans-2-imino-3-styryl thiazolidine present in the crude tetramisole and that this precipitate may then be removed.

Accordingly we provide a process of purifying tetramisole containing as an impurity trans-2-imino-3-styryl thiazolidine which process comprises adding to an aqueous solution of a tetramisole salt a sufficiency of a water soluble salt of phthalic acid, precipitating at least part of the said impurity, removing the precipitated impurity from the aqueous phase by phase separation means, e.g. by filtration, and recovering the purified tetramisole. Suitable water soluble salts of phthalic acid are the sodium salts, particularly the disodium salts. Whilst our process is operable in instances where the crude tetramisole contains other impurities it is desirable that these other impurities be removed from the tetramisole prior to the precipitation of the trans-2-imino-3-styryl thiazolidine.

Accordingly we provide a process of purifying tetramisole containing various impurities including trans-2-imino-3-styryl thiazolidine, which process comprises adding to an aqueous solution of a tetramisole salt a sufficiency of sodium dodecylbenzene sulphonate to precipitate at least part of certain of the impurities in said tetramisole, removing the precipitated impurities from the aqueous phase by phase separation means, adding to the resultant mother liquor a sufficiency of a water soluble salt of phthalic acid to precipitate at least part of the said trans-2-imino-3-styryl thiazolidine, removing the precipitated impurity by phase separation means and recovering the purified tetramisole.

The amount of the precipitant used to precipitate the trans-2-imino-3-styryl thiazolidine should be in excess, on a molar basis, of the trans-2-imino-3-styryl thiazolidine present. Thus, for example, useful results have been obtained when the molar ratio of precipitant used to trans-2-imino-3-styryl thiazolidine present is 2:1. However, as this ratio is increased a more complete precipitation of the impurity is obtained and it is preferred to use ratios from 4:1 to 20:1. Whilst still higher ratios may be used there is substantially dependent on the concentration of phthal-obtained is balanced by economic considerations.

The precipitation of trans-2-imino-3-styryl thiazolidine from solution as its phthalate salt is believed to be a simple mass action effect, hence the level of trans-2-imino-3-styryl thiazolidine remaining in solution after treatment is substantially dependent on the concentration of phthalate ion in solution. For this reason a reasonably large molar excess of precipitant is preferred. For most industrial (crude) tetramisole, usually in the form of an aqueous solution containing between 10% w./w. and 20% w./w. of tetramisole, addition of between 1 and 25 moles of our purifying agent per 100 moles of tetramisole is satisfactory; however, for highly impure products, as much as 50 moles of purifying agent may be necessary. In practice the amount of purifying agent to be used is best determined on each production batch and is dependent on the amount of impurity present.

Our process is conveniently performed at room temperature. The precipitation is preferably carried out in an acidic solution; preferably the pH of the solution is not greater than 6 and not less than 2, more preferably from 3 to 5, and most preferably 4. We have observed that whilst precipitation of the impurity commences upon mixing the precipitant with the solution to be treated, the crystallisation of the precipitate occurs rather slowly. It is preferable therefore that some time should elapse between adding the precipitant and separating the precipitate from the aqueous phase. We have found that this time is suitably between 5 minutes and 16 hours, usually between 0.5 hour and 1.5 hours.

An advantage of the present invention is that the purification by precipitation and removal of a small amount of precipitate is simple and can be carried out without a separate step such as recrystallization, virtually without losses such as are inevitable in the mother liquor when recrystallization is used; yet another advantage is the improved purity of the resultant L-tetramisole isomer.

Our invention is now demonstrated by but not restricted to the following examples. Unless otherwise stated all parts in the examples are by weight.

In the examples reference to "crude D,L-tetramisole hydrochloride" means D,L-tetramisole hydrochloride containing various impurities among which there was 2.6% w./w. of trans-2-imino-3-styryl thiazolidine hydrochloride.

Examples 1–5 inclusive

To a stirred 17% w./w. solution of crude D,L-tetramisole hydrochloride (D,L-tet.HCl) in water there was added an aqueous solution containing 0.2 mole percent, based on the D,L-tetramisole hydrochloride present, of sodium dodecylbenzene sulphonate. The precipitate which formed was removed by filtration. To the mother liquor there was added an aqueous solution containing 2 moles per litre of disodium phthalate in an amount such that there was present 0.2 mole disodium phthalate per mole of D,L-tetramisole hydrochloride. The pH of the resultant solution was adjusted to 4.0 by the addition of concentrated hydrochloric acid. The solution was stirred and samples were withdrawn at intervals as shown in Table 1. Any precipitate present was separated from the sample by filtration and the resultant mother liquor was analysed to determine the concentration of trans-2-imino-3-styryl thiazolidine hydrochloride (IST HCl) therein. The results are shown in Table 1.

TABLE 1

| Example No. | Time from start of precipitation at which sample was withdrawn (min.) | Percent w./w. IST HCl, based on D,L-tet.HCl, in mother liquor |
|---|---|---|
| 1 | 0 | 2.40 |
| 2 | 8 | 0.24 |
| 3 | 30 | 0.15 |
| 4 | 90 | 0.09 |
| 5 | 960 | 0.09 |

Examples 6 to 9 inclusive

A 17% w./w. solution of crude D,L-tetramisole hydrochloride in water was treated with sodium dodecylbenzene sulphonate as in Examples 1 to 5 and the precipitate was removed. The mother liquor was divided into four portions. To each portion there was added an amount of an aqueous solution containing 2 moles per litre of disodium phthalate to give varying ratios of moles of disodium phthalate per mole of D,L-tetramisole hydrochloride in the resultant solution. The various ratios used are set out in Table 2. In each case the pH of the solution was adjusted to 4.0 using concentrated hydrochloric acid, the mixture was stirred for 70 minutes and the precipitate which formed was removed by filtration. The resultant mother liquor was analysed to determine the concentration of trans-2-imino-3-styryl thiazolidine hydrochloride therein and the values obtained are set out in Table 2.

TABLE 2

| Example No. | Moles of disodium phthalate per mole D,L-tet. HCl | Percent w./w. IST HCl, based on D,L-tet.HCl, in mother liquor |
|---|---|---|
| 6 | 0.05 | 0.50 |
| 7 | 0.10 | 0.16 |
| 8 | 0.20 | 0.09 |
| 9 | 0.40 | 0.075 |

Examples 10–13 inclusive

A 17% w./w. solution of crude D,L-tetramisole hydrochloride in water was treated with sodium dodecylbenzene sulphonate as in Examples 1 to 5 and the precipitate was removed. The mother liquor was divided into four portions and sufficient disodium phthalate was added to each portion to give a ratio of 0.2 mole of disodium phthalate per mole of D,L-tetramisole hydrochloride present. Concentrated hydrochloric acid was added to the resultant solutions in varying amounts to adjust the pH of the solutions to the values as set out in Table 3. Each mixture was stirred for 70 minutes and the precipitate which formed was removed by filtration. The resultant mother liquor was analysed to determine the concentration of trans-2-imino-3-styryl thiazolidine hydrochloride therein and the values obtained are set out in Table 3.

TABLE 3

| Example No. | pH of solution | Percent w./w. IST HCl, based on D,L-tet.HCl, in mother liquor |
|---|---|---|
| 10 | 3.0 | 0.13 |
| 11 | 4.0 | 0.09 |
| 12 | 5.0 | 0.13 |
| 13 | 6.0 | 0.59 |

Example 14

The procedure of Examples 1 to 5 was repeated except that in the present example the treatment of the D,L-tetramisole hydrochloride solution with sodium dodecylbenzene sulphonate was omitted. The rate of crystallization of the precipitate containing the impurities was slower than that of Examples 1 to 5 and it took several hours for the concentration of trans-2-imino-3-styryl thiazolidine in the mother liquor to be lowered to the level of that obtained in Example 3.

Examples 15 to 20 inclusive

The procedure of Examples 1 to 5 was repeated except that in the present examples the precipitate formed as a result of treating the solution with sodium dodecylbenzene sulphonate was not removed from the reaction vessel prior to the addition of disodium phthalate. The results obtained are shown in Table 4.

TABLE 4

| Example No. | Time from start of precipitation at which sample was withdrawn (min.) | Percent w./w. IST HCl, based on D,L-tet.HCl, in mother liquor |
|---|---|---|
| 15 | 0 | 2.40 |
| 16 | 10 | 0.36 |
| 17 | 40 | 0.23 |
| 18 | 70 | 0.20 |
| 19 | 100 | 0.18 |
| 20 | 145 | 0.16 |

Example 21

To 200 ml. of a stirred aqueous solution containing 17% w./w. of a commercially available D,L-tetramisole hydrochloride, which contained as an impurity 2.6% w./w. of trans-2-imino-3- styryl thiazolidine, was added 2 g. of a filter aid ("Celite," registered trademark) and 0.8 g. of an aqueous solution containing 30% w./w. of sodium dodecylbenzene sulphonate. The stirring was continued for 15 minutes during which time a precipitate formed. The precipitate was separated from the aqueous phase by filtration. There was then added to the aqueous phase 7.1 ml. of an aqueous solution containing 2 moles per litre of disodium phthalate and the pH of the mixture was adjusted to 4.0 by the addition of concentrated hydrochloric acid. The mixture was stirred for 70 minutes during which time a precipitate formed. This precipitate was removed from the aqueous phase by filtration. There was then added to the aqueous phase 103 ml. of an aqueous solution solution containing 27.0% w./w. of disodium N-p-toluenesulphonyl-L(+)-glutamate. To the stirred mixture there was added over two hours 9.0 ml. concentrated hydrochloric acid to adjust the pH of the mixture to 4.0. A precipitate of L-tetramisole-N-p-toluenesulphonyl-L(+)-glutamate was formed. Stirring was continued for a further 30 minutes after which the precipitate was separated from the aqueous phase, washed with 20 ml. cold water and dried in a vacuum oven at 60° C. There was thus obtained 30 g. of L-tetramisole-N-p-toluenesulphonyl-L(+)-glutamate (monohydrate) was shown by analysis to contain 0.029% w./w., based on the tetramisole content, of trans-2-imino-3-styryl thiazolidine. When converted to L-tetramisole base the product was shown to be 99% optically pure.

Example 22

For the purposes of comparison the procedure of Example 21 was repeated, but in the present example the treatment with disodium phthalate was omitted. There was thus obtained 30 g. of L-tetramisole-N-p-toluenesulphonyl - L(+)-glutamate which was converted to L-tetramisole base; the product contained 5% trans-2-imino-3-styryl thiazolidine.

I claim:

1. A process of purifying tetramisole containing as an impurity trans-2-imino-3-styryl thiazolidine which process comprising adding to an aqueous solution of a tetramisole salt a water soluble salt of phthalic acid, precipitating at least part of the said impurity, removing the precipitated impurity from the aqueous phase by phase separation means and recovering the purified tetramisole, the molar ratio of water soluble salt of phthalic acid to trans-2-amino-3-styryl thiazolidine being at least 2:1.

2. A process according to claim 1 wherein the molar ratio of water soluble salt of phthalic acid to trans-2-imino-3-styryl thiazolidine is from 4:1 to 20:1.

3. A process according to claim 1 wherein the water soluble salt of phthalic acid is disodium phthalate.

4. A process according to claim 1 wherein the pH of the solution from which the trans-2-imino-3-styryl thiazolidine is precipitated is not greater than 6 and not less than 2.

5. A process of purifying an aqueous solution of tetramisole containing various impurities including trans-2-imino-3-styryl thiazolidine which process comprises partially purifying said aqueous solution of tetramisole by addition of sodium dodecyl benzene sulphonate to precipitate at least part of certain of the impurities in said tetramisole solution, removing the precipitated impurities by phase separation means to give an aqueous solution of tetramisole comprising trans-2-imino-3 styryl thiazolidine, adding to the resultant mother liquor a water soluble salt of phthalic acid to precipitate at least part of the said trans-2-imino-3-styryl thiazolidine, removing the precipitated impurity by phase separation means and recovering the purified tetramisole, the molar ratio of water soluble salt of phthalic acid to trans-2-imino-3-styryl thiazolidine present in the tetramisole solution after the sodium dodecyl benzene sulphonate treatment being at least 2:1.

6. A process according to claim 5 wherein the molar ratio of water soluble salt of phthalic acid to trans-2-imino-3-styryl thiazolidine is from 4:1 to 20:1.

7. A process according to claim 5 wherein the water soluble salt of phthalic acid is disoduim phthalate.

8. A process according to claim 5 wherein the pH of the solution from which the trans-2-imino-3-styryl thiazolidine is precipitated is not greater than 6 and not less than 2.

References Cited
UNITED STATES PATENTS 3,574,227  4/1971  Rimington et al. ___ 260—306.7

RICHARD J. GALLAGHER, Primary Examiner

U.S. Cl. X.R.

260—999